United States Patent [19]

Arons et al.

[11] 4,294,792

[45] Oct. 13, 1981

[54] MOLDED PLASTIC PARTS, PARTICULARLY SPIN-CAST PLASTIC PARTS FOR EYEGLASS FRAMES

[75] Inventors: Irving J. Arons, Peabody; Richard E. Merrill, Wakefield; Arthur P. Drennan, Brighton, all of Mass.

[73] Assignee: Universal Optical Company, Inc., Providence, R.I.

[21] Appl. No.: 955,149

[22] Filed: Oct. 27, 1978

[51] Int. Cl.³ .............................................. B29C 5/04
[52] U.S. Cl. .................................. 264/311; 264/310; 264/337
[58] Field of Search ...................... 264/310, 311, 337; 425/DIG. 44

[56] References Cited

U.S. PATENT DOCUMENTS

| | | | |
|---|---|---|---|
| 3,708,567 | 1/1973 | Hampel | 264/331 |
| 4,002,418 | 1/1977 | Wallace | 264/311 |
| 4,034,955 | 7/1977 | Wallace | 425/425 |

FOREIGN PATENT DOCUMENTS

| | | | |
|---|---|---|---|
| 1117298 | 11/1961 | Fed. Rep. of Germany | 264/311 |
| 3929398 | 1/1966 | Japan | 264/311 |

OTHER PUBLICATIONS

Rubber-Mold Spin-Casting, Tekcast Ind. Inc., In Machine Design, Jan. 1977, pp. 113-117.
Spencer, Centrifugal Casting of Thermoplastics, SPE Journal, Jul. 1962, pp. 774-779.

Primary Examiner—James H. Derrington
Attorney, Agent, or Firm—Kenyon & Kenyon

[57] ABSTRACT

Disclosed are molded plastic parts particularly eyeglass frame components, the centrifugal spin-casting of such parts and mold apparatus for producing such parts. Also disclosed are flexible molds for spin-casting eyeglass fronts and temples. In accordance with one aspect of the invention, the plastic parts are made from a resin system or mixture in liquid form comprising an epoxy resin, a curing agent therefore and an ultra-violet absorber and/or an antioxidant. DGEBA-type epoxy resins and polyoxypropylenediamine curing agents are the disclosed preferred epoxy resin and curing agent.

13 Claims, 14 Drawing Figures

MOLDED PLASTIC PARTS, PARTICULARLY SPIN-CAST PLASTIC PARTS FOR EYEGLASS FRAMES

BACKGROUND OF THE INVENTION

The present invention relates to molded plastic parts, to the centrifugal spin-casting of such parts, and to mold apparatus for producing such parts, particularly eyeglass frame components such as fronts and temples.

SUMMARY OF THE INVENTION

It is an object of the present invention to provide molded plastic parts, particularly eyeglass frame components such as fronts and temples.

It is also an object of the present invention to provide plastic parts made by spin-casting, particularly eyeglass frame components such as fronts and temples.

It is also an object of the present invention to provide such spin-cast plastic parts of improved quality.

It is another object of the present invention to provide spin-cast plastic parts, particularly eyeglass frame components such as fronts and temples, which are economically made.

It is another object of the present invention to provide a process for making spin-cast plastic parts, particularly eyeglass frame components such as fronts and temples.

It is still another object of the present invention to provide apparatus for making spin-cast plastic parts, particularly eyeglass frame components such as fronts and temples.

Accordingly, the present invention provides a method and apparatus for producing spin-cast plastic parts. Additionally, the present invention provides molded plastic parts, particularly eyeglass frame components such as fronts and temples, and such parts made by spin-casting.

In accordance with an aspect of the invention, the spin-cast plastic parts are made easily and economically and exhibit excellent physical properties. In particular, plastic eyeglass frame components according to the invention are durable, flexible, creep resistant, dimensionally stable, have low water absorption and are resistant to reaction with body chemicals and to color changes and yellowing caused by, for example, exposure to heat and/or the sun. Moreover, the frame components according to the invention are light-weight and yet are hard and resist scratching. Additionally, eyeglass frame components according to the invention have excellent definition of undercuts, overhangs, curves and contours.

The eyeglass frame components according to the invention are made from a plastic material which has a cross-linked structure when cured. The plastic material and the cured cross-linked structure thereof impart a "formed" configuration to the parts when cured. Heating the parts to at or above their softening (heat distortion) temperature allows the parts to be further shaped from the "formed", cured configuration to provide individual fitting and for lens insertion. The parts retain this further shaped configuration when cooled and are dimensionally stable and creep resistant as mentioned above. The parts will revert to the "formed" configuration upon being reheated to at or above their softening temperature while they are in an unrestrained state. Thereafter, while still at or above the softening temperature, they may be again further shaped, or if cooled they may be reheated to at or above the softening temperature and again further shaped.

In accordance with one aspect of the invention, the plastic parts are made from a resin system or mixture in liquid form (liquid resin system) comprising an epoxy resin, a curing agent therefor and an ultra-violet absorber or stabilizer. Further in accordance with this aspect of the invention, the liquid resin system includes an antioxidant. The ultraviolet absorber and the antioxidant color-stabilize the cured resin system, the ultraviolet absorber inhibiting yellowing and the antioxidant inhibiting breakdown due to heat and oxidation which could otherwise cause discoloration. The epoxy resin and curing agent are preferably substantially transparent, clear and of low color, and the liquid resin system also preferably includes a small amount of a blue dye. As a result of the liquid resin system including the combination of a substantially clear, transparent and low color epoxy resin and curing agent, and the blue dye, the parts are clear and water white and may be further colored to a desired hue or combination of hues.

The liquid resin system according to this aspect of the invention forms a thermoset plastic which possesses at least some flexibility with good toughness after setting and curing. Thermoset plastics which possess such flexibility and toughness are disclosed in U.S. Pat. Nos. 3,462,393 and 3,708,567 which are incorporated herein by reference, and in "Dow Epoxy Resins 1974, Report 35-1" which is also incorporated herein by reference.

The liquid resin system according to this aspect of the invention is curable at a temperature of from about 70° C. to about 150° C. The cured resin parts according to the invention have a softening temperature of from about 65° C. to about 95° C. Preferably curing is accomplished at from about 80° C. to about 120° C., and the cured resin parts have a softening temperature of about 77° C. (about 170° F.).

A liquid resin system comprising a substantially clear, colorless or low color, low viscosity liquid diglycidyl ether of Bisphenol A (DGEBA)-type, or simply a low viscosity BIS-type, epoxy resin mixed with a clear, colorless or light-colored, low viscosity polyoxypropylenediamine curing agent and an ultra-violet absorber has been found to be particularly suitable for eyeglass parts such as fronts and temples. Such BIS-type resins preferably have a low Gardner color of, for example, about 1.

Additionally, benzylidene malonate and benzotriazole ultra-violet absorbers have been found to be particularly suited for a liquid resin system used to make eyeglass parts and significantly reduce yellowing of the eyeglass parts.

Still further, organic phosphite antioxidants have been found to be particularly suited for a liquid resin system used to make the eyeglass parts and reduce discoloration as mentioned above. Some benzylidene malonate and benzotriazole ultra-violet absorbers combined with organic phosphite antioxidants have also been found to be particularly suited for a liquid resin system used to make eyeglass parts.

A preferred low viscosity, pure, liquid BIS (DGEBA)-type epoxy resin is available from Dow Chemical Company as D.E.R. 332 epoxy resin and a preferred amine curing agent therefor is a polyoxypropylenediamine which is available from Jefferson Chemical Company as Jeffamine D-230. A preferred ultra-violet absorber is para-methoxybenzylidenemalonic acid, dimethyl ester which is available from American Cyanamid Co. as Cyasorb UV 1988. A preferred antioxidant is trisnonylphenyl phosphite available from Argus Chemical Co. as Mark 1178. A preferred dye to obtain a water white, clear part is Perox 3B Blue available from Morton Chemical Company.

In accordance with the invention, the applicants have found that the BIS-type epoxy resins are suitable for the liquid resin system of the invention and further that the low, medium and standard viscosity BIS-type epoxy resins may be satisfactorily utilized in the liquid resin system. However, the applicants have found that the low viscosity BIS-type epoxy resins are especially desirable because of their low color level, i.e., they are clear and transparent and with the addition of a blue dye, a clear water white part may be produced. In addition to Dow Chemical Co. D.E.R. 332, low viscosity BIS-type epoxy resins are available from Ciba-Geigy Corp. as Araldite 6004 and from Celanese Resins Co. as Epi-Rez 508. Medium and standard viscosities BIS-type epoxy resins are also available from Dow, Ciba and Celanese, and also from Shell Chemical Co. under respective company tradenames. For example, a medium viscosity and a standard viscosity BIS-type epoxy resin is available from Dow as D.E.R. 330 and D.E.R. 331, respectively.

Still other BIS-type DGEBA resins are available which are suitable for use in the liquid resin system according to the invention and include fast reacting epoxy resins.

In addition to the BIS-type epoxy resins, other epoxy resins have been found by the applicants to be suitable in liquid resin systems used for plastic parts. For example, flexible resins of diglycidyl ethers of propylene glycol available from Dow Chemical Co. as D.E.R. 732 and 736 may be substituted for part of the BIS-type epoxy resins.

Similarly, other amine curing agents for the epoxy resins have been found to be suitable in the liquid resin systems used for the production of spin-cast parts. For example, N-Isopropyl-1,3-propanediamine and N-(3-aminopropyl)cyclohexylamine, both available from Ames Laboratories, Inc., have been found to be suitable.

In accordance with another aspect of the invention, the parts are made by a spin-casting process which comprises introducing a liquid resin system into a spinning, flexible mold which is rigidly supported, removing the mold from the spin caster apparatus while the parts cast therein are still soft and uncured and as yet not self-supporting, hardening (curing) the parts while in the mold, and thereafter removing the parts from the mold. It is preferred that a mold release agent be applied to the mold prior to introduction of the liquid resin system therein. It is also preferred that the molds be preheated when the liquid resin system is introduced therein. The liquid resin system described herein and which has a viscosity of about 200 cps to about 400 cps at 25° C., is particularly suited for use in the process of the invention to produce the spin-cast parts. When such a liquid resin system is utilized, the mold is preheated to from about 60° C. to about 100° C. and the molded part is cured in the mold at a mold temperature of from about 80° C. to about 120° C. for from about one to about two hours.

In accordance with the invention, mold apparatus for producing plastic spin-cast parts comprise opposed mold halves, at least one of which is flexible, having cooperating facing surfaces shaped to form a plurality of the desired spin-cast parts from a liquid plastic material, with the mold surfaces cooperating to form a mold cavity for each part. The mold halves preferably are of generally disc-like shape and each includes a center cut-out with the cut-outs forming a central cavity when the mold halves are mated. A central feed spout is provided through which the liquid plastic material is introduced into the apparatus. The mold cavities are preferably substantially equally spaced about the mold. Preferably, both mold halves are flexible. When used to produce spin-cast eyeglass parts in accordance with the invention, the cooperating facing surfaces of the mold halves and the respective cavity molds are configured in the form of an eyeglass front or temple.

In accordance with another aspect of the invention, it has been found that flexible mold halves which comprise (by weight) from about 50% to about 100% of heat vulcanized (HV) ethylene propylene diene monomer rubber (EPDM) and from about 0% to about 50% inert fillers are particularly suitable for producing spin-cast parts from a liquid resin system according to the invention. They are flexible yet show significantly less deterioration than silicone rubber molds when used with liquid resin systems. The flexible mold halves may, according to the invention, include up to about 10% by weight of heat vulcanizable silicone rubber.

An important consideration in spin casting is the removal of air from the mold cavities during spinning and formation of the part. In accordance with the invention, it has been found that the use of a larger diameter mold yields higher centrifugal forces at the mold periphery for the same spin speed and that this assists in the removal of air from the mold cavities during spinning. For example, when utilizing an 18 inch diameter mold as described herein, spin speeds of from about 300 RPM to about 600 RPM have been found to be suitable. The disposition of the mold cavities in which the parts are cast and the runner layout have also been found to be important. With respect to the eyeglass fronts, it was found that mold cavities layed out extending circumferentially about the mold periphery with the runners layed out so that the liquid plastic material flows radially from the central cavity of the mold to enter each mold cavity at circumferentially spaced locations, significantly improves the removal of air. Thus, in accordance with another aspect of the invention, the mold cavities are disposed radially outwardly from the mold center and extend circumferentially about the mold periphery, and the runners extend radially and are circumferentially spaced and connected to the cavities at circumferentially spaced locations. More specifically, each runner is communicated with the interior of the mold cavity adjacent each end of the mold cavity. This arrangement permits air to flow from the mold cavity through each runner as well as circumferentially through the mold cavity and out through the circumferentially spaced downstream runner, i.e., the runner at the trailing end of the mold cavity.

When used to make temples, the mold cavities are disposed extending radially outwardly. A plurality of runners extend radially outwardly from the central cavity to a first circumferentially-extending runner which is connected to the inner radial end of each mold cavity. The outer radial end of each mold cavity is connected to a second circumferentially extending runner which is communicated with the central cavity by at least two other radially-extending runners. Air is removed by flowing from the inner radial end of each mold cavity to the first circumferentially-extending runner and from there to the central cavity through the plurality of radially-extending runners. Air is also removed by flowing outwardly from the outer ends of the temple mold cavities to the central cavity through the second circumferentially-extending runner and the at least two other radially-extending runners.

It was also found in accordance with another aspect of the invention that the gate configuration connecting the runners to the mold cavities affects air removal and that a fan-shaped gate significantly improves air removal over the conventional necked gate.

A vent system for the mold apparatus was also found to assist in the removal of air. Hollow, preferably flexible members, are inserted into the central feed spout with a member extending through the central cavity into one of a pair of runners connected to each front mold cavity, or in the temple mold, inserted into the other radially-extending runners connecting the second circumferentially-extending runner and the central cavity. The tops of the hollow members extend to a predetermined location which is above the point at which liquid plastic material is supplied to or rises in the feed spout. The hollow members thereby provide an unobstructed air escape passage from each runner pair to a point above the point at which the liquid plastic material is introduced into the feed spout. A short length of a simple, bendable plastic drinking straw was found to be well suited to serve as the hollow member.

The flexible mold is comprised of upper and lower mold halves at least one of which is flexible, which are sandwiched between rigid back-up means. The purpose of the rigid back-up means is to provide rigidity to the mold as an assembly so that the mold assembly may be removed from the spin caster apparatus and transported after spinning but before the liquid plastic material has hardened without disturbing the plastic cast in the mold cavities. Thus, the mold may be removed from the spin caster apparatus as soon as casting is complete, which takes a relatively short time, without retaining the mold in the spin caster apparatus for curing. This increases production in that many more parts may be spin-cast per unit of time in each spin caster apparatus since the relatively long curing time required to harden the part and achieve optimum physical properties is spent outside of the spin caster apparatus. The back-up means preferably comprise disc-like plates. In the disclosed embodiments, the rigid back-up means comprise upper and lower mold support disc- or plate-like frame members which compress and hold the mold halves together.

In order to improve reproducibility and obtain uniform parts, the frame members are drawn together to exert a predetermined reproducible pressure on the mold halves.

An annular peripheral rib is provided in each of the mold halves on the surface thereof facing the back-up means. The raised mold surface produced by the rib will cause a greater pressure to be exerted about the periphery of each mold half by the back-up means. This helps prevent leakage of liquid plastic material from between the rubber mold halves during the spin casting operation.

In one preferred embodiment, the mold halves are about 18 in. diameter and each mold half is about ½ inch in thickness to accomodate the required depth for the mold cavities.

In another preferred embodiment, the mold halves are also about 18 inches in diameter, the top mold half is about ¼ inch in thickness throughout while the lower mold half is about ¼ inch in thickness in the central part thereof in which are disposed the runners and about ½ inch in thickness in the peripheral region in which are disposed the frame mold cavities. The lower mold half is therefore stepped in thickness about the periphery thereof. The stepped mold according to the invention reduces the rubber material required to fabricate the mold while providing the necessary depth in the stepped region for the mold cavities. In this embodiment, the rigid back-up means further comprises means adapted to being received in the central reduced thickness region of the stepped mold half.

These and other aspects of the invention will be more apparent from the following description of the preferred embodiments thereof when considered with the accompanying drawings and appended claims.

BRIEF DESCRIPTION OF THE DRAWINGS

The present invention is illustrated by way of example and not by way of limitation in the figures of the accompanying drawings in which like references indicate similar parts and in which:

FIG. 3 is a cross-section view of the mold apparatus of FIG. 1 taken along line 3—3 thereof;

DESCRIPTION OF THE PREFERRED EMBODIMENTS

Referring now more particularly to the drawings, mold apparatus according to the invention for producing spin-cast eyeglass fronts and temples are illustrated. As shown in FIGS. 1–4, the mold apparatus 10 according to one embodiment for producing eyeglass fronts comprises a mold 12 sandwiched between rigid back-up means in the form of plate-like frame members 14, 16 and held together as an assembled unit (FIG. 1) by bolts 18 extending from the lower frame member 14 through holes 19 and by nuts 20. The mold 12 comprises upper and lower mold halves 22 and 24 in which are disposed mold cavities 26 for eyeglass fronts and the runner system 28 connecting the mold cavities to the center of the mold where a liquid resin system is introduced.

A multiplicity of mold cavities are disposed in the mold halves in order to produce a multiplicity of eyeglass fronts with each mold per each spin cast operation. As illustrated, there are eight mold cavities. However, there may be more or less than eight mold cavities. Locators in the form of Pal or acron-type nuts 30 (FIGS. 3–5) are provided in the lower mold half and extend into corresponding cavities 32 in the upper mold half to prevent the mold halves from sliding or misaligning with respect to each other. An alignment groove or notch in each mold half may be provided to assist in aligning the mold halves when they are mated. The mold halves 22 and 24 are flexible and are made from ethylene propylene diene monomer rubber (EPDM) by a heat vulcanized (HV) process.

Each mold half may be made as follows. Unvulcanized EPDM rubber in sheet form is placed in the bottom half of a vulcanizing frame. Mold masters representing the desired mold cavity pattern are placed in the bottom half of the frame over the EPDM rubber sheet. The locators are also inserted into the bottom half of the vulcanizing frame over the EPDM rubber sheet. Additional EPDM rubber also in the form of a sheet is placed over the mold masters in the bottom half of the vulcanizing frame. A mold release agent is applied to the mating surfaces of the EPDM rubber sheets prior to placing the upper sheet into the vulcanizing frame. This facilitates mold half separation after vulcanization. The top half of the vulcanizing frame is located and the frame put in a pre-heated vulcanizing press. Pressure and heat are applied for a predetermined time. After cooling, the vulcanizing frame is separated and the mold masters are stripped. Thereafter, the runners are cut in the mold halves. Some additional cutting may be necessary as is known in the art.

Use of the EPDM rubber material and fabrication of the mold by heat vulcanization results in an exact reproduction of the pattern in the mold. The applicants have discovered that such HV EPDM rubber molds show significantly less deterioration with liquid resin systems than conventional molds made with silicone rubber. Additionally, the HV EPDM rubber mold is harder than either a RTV (room temperature vulcanized) or heat vulcanized silicone rubber mold. The applicants have further found that the EPDM rubber mold may contain small amounts of silicone rubber—up to about 10%—for improved release properties without any significant degradation in its characteristics. Details concerning the production of mold masters are known to those in the art.

It has been found desirable to provide molds larger than the usual nine, twelve or fifteen inch molds to improve air removal from the mold cavities as a result of the higher centrifugal forces achieved in the mold cavities. With larger diameter molds, higher radial speeds are obtained for a given spin rate (RPM) than for small diameter molds. For example, the diameter of the mold halves 22 and 24 can be about 18 inches or larger and can be rotated at from about 300 RPM to about 600 RPM. Typically, the upper 22 and lower 24 mold halves are about one-half inch in thickness.

Figures 4, 7, 8, 9:
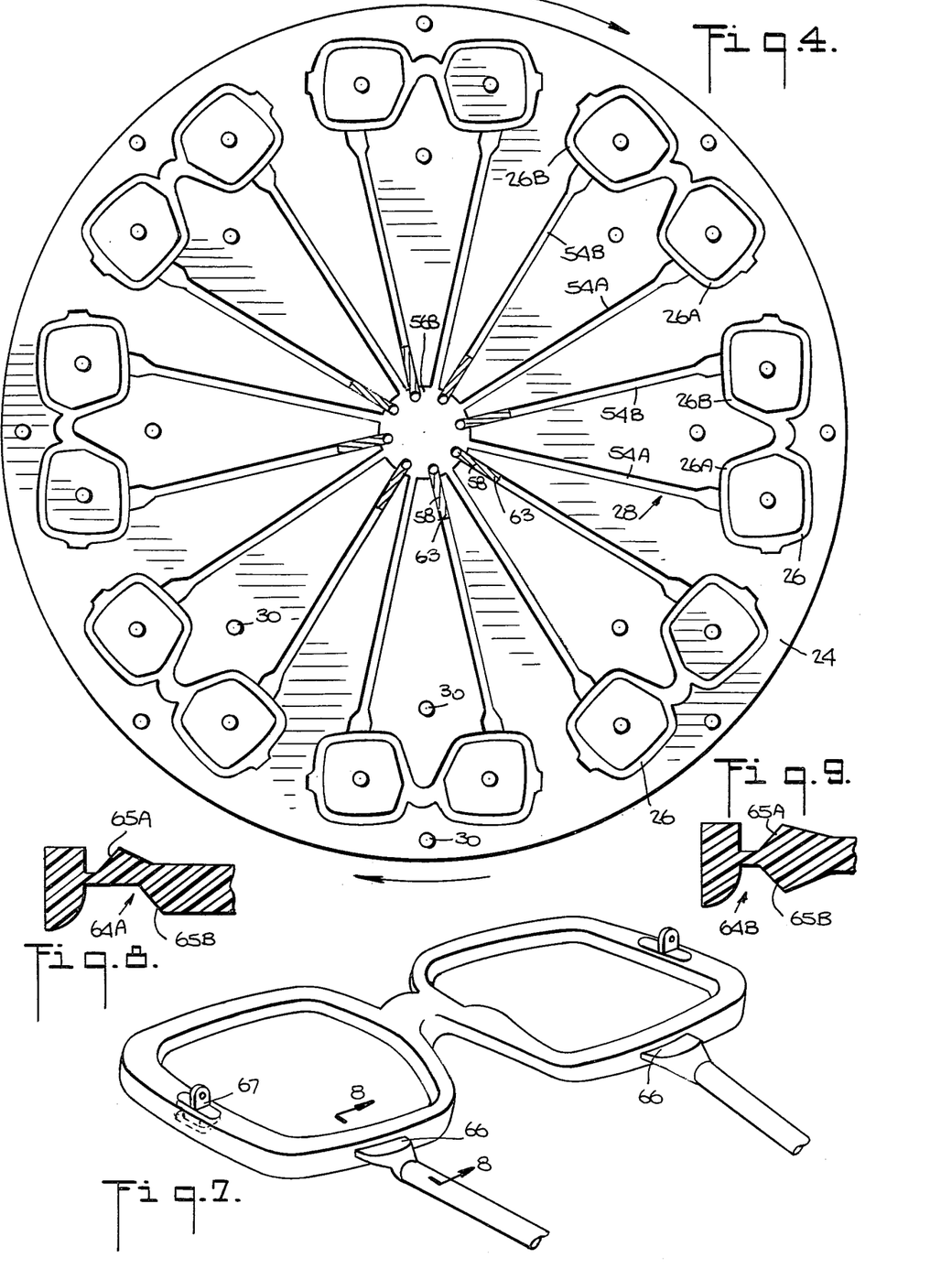
FIG. 4 is a top plan view of a flexible bottom mold half according to the invention for producing eyeglass fronts and which shows the cavity layout, the runner system, the vent system and the fan-shaped gates according to the invention.
FIG. 7 is a top perspective view of an eyeglass front before degating made from the mold of FIG. 1.
FIG. 8 is a cross-section view taken along line 8—8 of FIG. 6 illustrating the fan-shaped gate according to one embodiment of the invention.
FIG. 9 is a cross-section view similar to that of FIG. 8 illustrating another fan-shaped gate according to another embodiment of the invention.

The disposition of the mold cavities in the mold halves and the runner layout are important considerations with respect to removal of air from the mold cavities. In FIG. 4 is shown lower mold half 24 in which the mold cavities 26 are disposed adjacent the circumference of the mold half. Each mold cavity extends circumferentially in the mold-half. The runner system 28 includes runners 54 A, B extending radially outwardly from the center of the mold. Each of the mold halves includes a circular center cut-out 56A, B in the center thereof, and when the mold halves are mated, the cut-outs form a central cavity 56 (FIG. 3) which receives the liquid resin system introduced into the center feed spout 60 and acts to supply the liquid resin system to the runners. The central cavity 56 is connected with a portion of a respective mold cavity by a respective runner. Specifically, a pair of radially extending circumferentially spaced runners 54 A, B connect the central cavity to each mold cavity. With respect to the clockwise direction of rotation indicated by the arrow in FIG. 4, an upstream runner 54A connects one side 26A of the mold cavity with the central cavity and a downstream runner 54B connects the opposed side 26B of the mold cavity with the central cavity 56. Thus, when the liquid resin system is introduced into the central feed spout and supplied to the central cavity 56, the liquid resin system flows radially outwardly from the center of the mold to both sides of the mold cavities 26 through runners 54A and 54B by spinning of the mold. Entrapped air in the mold cavities passes back to the central cavity through both runners 54A and 54B. Additionally, there may be a migration of air along the mold cavities from the upstream side 26A to the downstream side 26B and through the downstream runner 54B to the central cavity 56 due to spinning of the mold in the direction indicated by the arrow.

Figure 1:
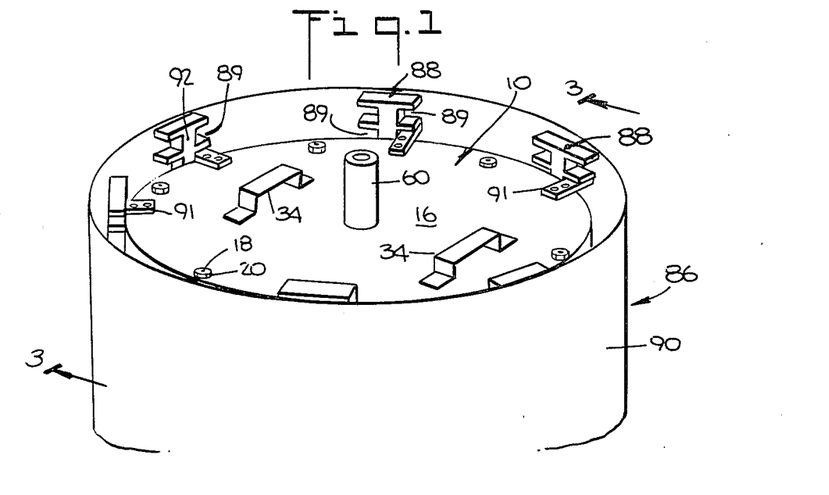
FIG. 1 is a perspective view of the assembled mold apparatus according to one embodiment of the invention mounted in a centrifugal spin caster apparatus.

To further assist removal of air from the mold cavities and runner system, tubular members in the form of bendable drinking straws 58, (FIGS. 3, 4 and 6) extend into each downstream runner 54B from the central cavity 56 of the mold halves. The drinking straws are flexed to about a 90° angle (FIG. 3) with one end disposed in each downstream runner and the other end extending through the central cavity upwardly through a hole in the upper frame member and into the central feed spout 60. The ends 62 (FIG. 3) extend into the feed spout above the highest point to which the liquid resin system is permitted to rise or be filled. Referring to FIGS. 1, 3 and 4, the liquid resin system is introduced into the feed spout, and moves axially into the central cavity and outwardly through the upstream runners 54A, the straws completely occupying the passages of the downstream runners 54B and preventing entry of the liquid resin system into or around the straws in the downstream runners from the central cavity. The liquid resin system during spinning progresses radially outwardly through the upstream runners 54A to enter the upstream sides 26A of the mold cavities. The resin system then progresses in the mold cavities from the upstream sides to the downstream sides due to spinning and leaves the mold cavities through the downstream runners 54B. The liquid resin then progresses through the straws and re-enters the central feed spout 60. The circuit for the liquid resin system is from the central feed spout, through the upstream runners 54A to the mold cavities, and back to the central feed spout through the downstream runners 54B. Thus, the downstream runners act only as returns for the liquid resin system. In addition to the flow of air from the mold cavities inwardly through the upstream runners, there is a migration of air from within each mold cavity to the downstream side 26B and out to the central feed spout 60 through the straws in downstream runners 54B. Air enters the ends 63 of the straws in the downstream runners and passes through the straws and out from opposed ends 62 of the straws. The straws thus ensure that there is an adequate air passage from each cavity to the central cavity.

In order to still further improve the air removal from the mold cavities, the gate connecting the runners with the mold cavities is fan-shaped as shown by the formed gates in FIGS. 7–9. As can be seen in the cross-sections of the formed gates in FIGS. 8 and 9, the passage to each mold cavity of gate 64A in FIG. 8 and gate 64B in FIG. 9 is necked-down vertically at 65A,B while the horizontal width of the gate is fanned at 66 (FIG. 7). In FIG. 8, the vertical necking is off-set. The gates as illustrated in FIGS. 7 and 8 both provide a passage to the interior of the mold cavity which is vertically between, preferably midway between, the top and bottom of the mold cavities. This configuration improves air removal from the cavities over the conventional, necked gates and facilitates gate removal (degating) from the finished parts following curing.

Figures 5, 9, 10:
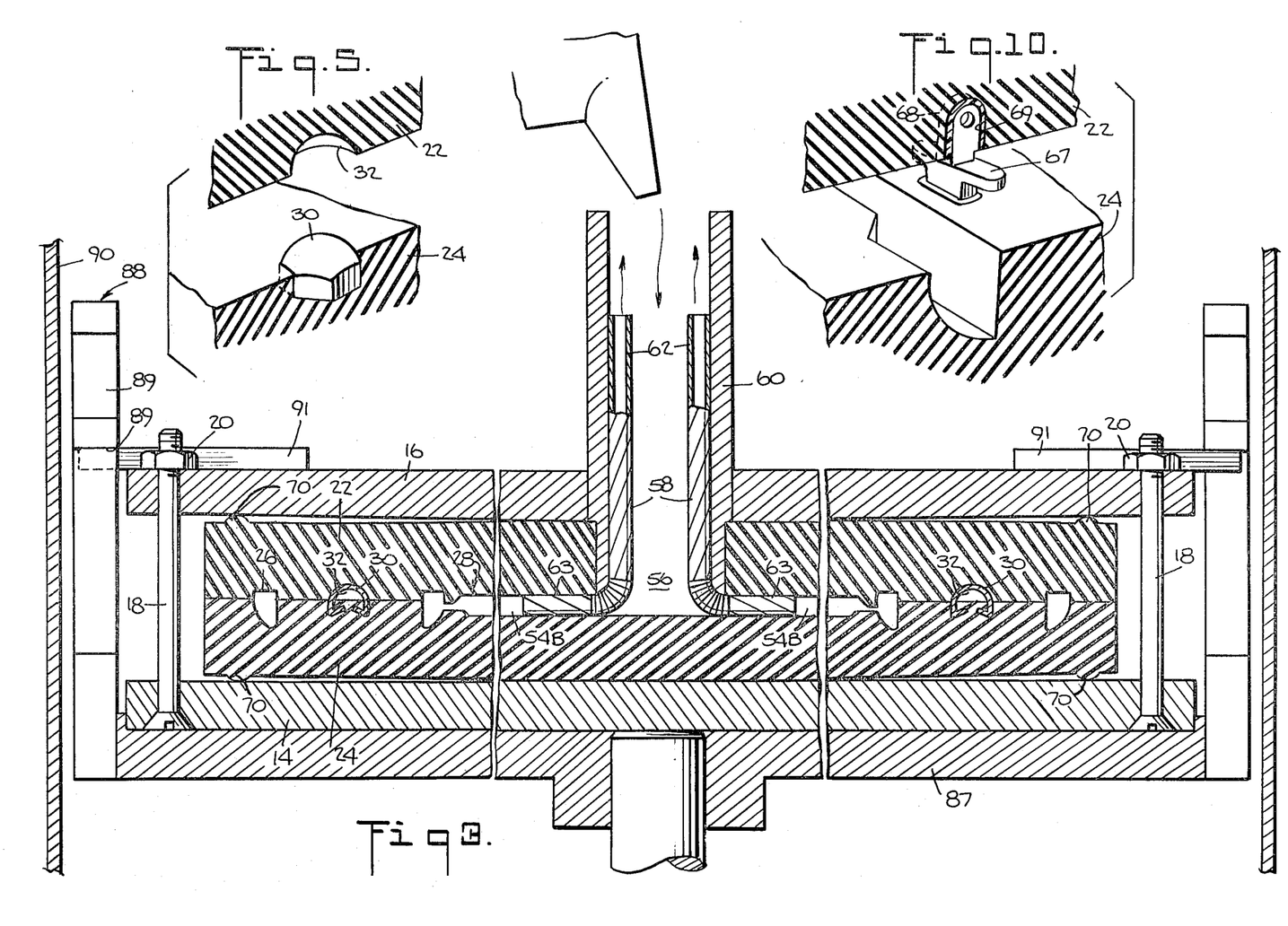
FIG. 5 is an enlarged perspective view of a portion of the mold halves of FIG. 2 in section showing the mold locators.
FIG. 10 is an enlarged perspective view of a portion of the mold halves of FIG. 2 in section showing the hinge inserts supported in the upper mold half and extending into a mold cavity.

Referring to FIG. 10, the holes in the hinge posts 67 or other hardware inserts are masked to prevent filling of holes in the hinge parts with the liquid resin system, and to prevent air displacement by the liquid resin system which may lead to the formation of air bubbles in the castings. A simple rubber or plastic cap 68 may be used for this purpose or a silicone rubber sealant may be applied. In FIG. 10, a cap 68 is placed over the hinge post portion which would protrude from the cast eyeglass front. The caps 68 with depending hinge posts 67 are inserted in respective cavities 69 in the upper mold half with the lower part of the hinge post being suspended within the respective mold cavities in the lower mold half.

Each of the mold halves on the outer surface thereof includes an annular ridge or rib 70. The ribs face the back-up means to provide a mold surface which will be engaged by the back-up means to exert additional pressure along the rib. This forces the mold halves closed along the periphery thereof at an increased pressure to prevent leakage of liquid resin system from between the mold halves during spin casting. Any dead space on the exterior surfaces of the mold halves resulting from the ribs can be filled with "cheaters" or compensating pads of foam rubber, for example.

Before assembly of the mold, a mold release agent, for example, a TFE Teflon spray, is applied to the mold halves before the halves are mated and the liquid resin introduced so that the cast parts may be easily separated from the mold half.

After insertion of the hardware inserts, the mold apparatus 10 is assembled by mating the mold halves 22 and 24 as described above, placing the mated mold halves on the lower frame member 14, locating the upper frame member 16 with the bolts 18 extending through holes 19 and sandwiching the mold halves under compression by tightening nuts 20 on bolts 18 to a predetermined torque. The feed spout 60 is inserted into the central cavity 56 through the central hole in the upper frame member. Handles 34 secured to upper frame member 16 are provided for lifting and transporting the assembled mold apparatus 10.

Figures 11, 11A:
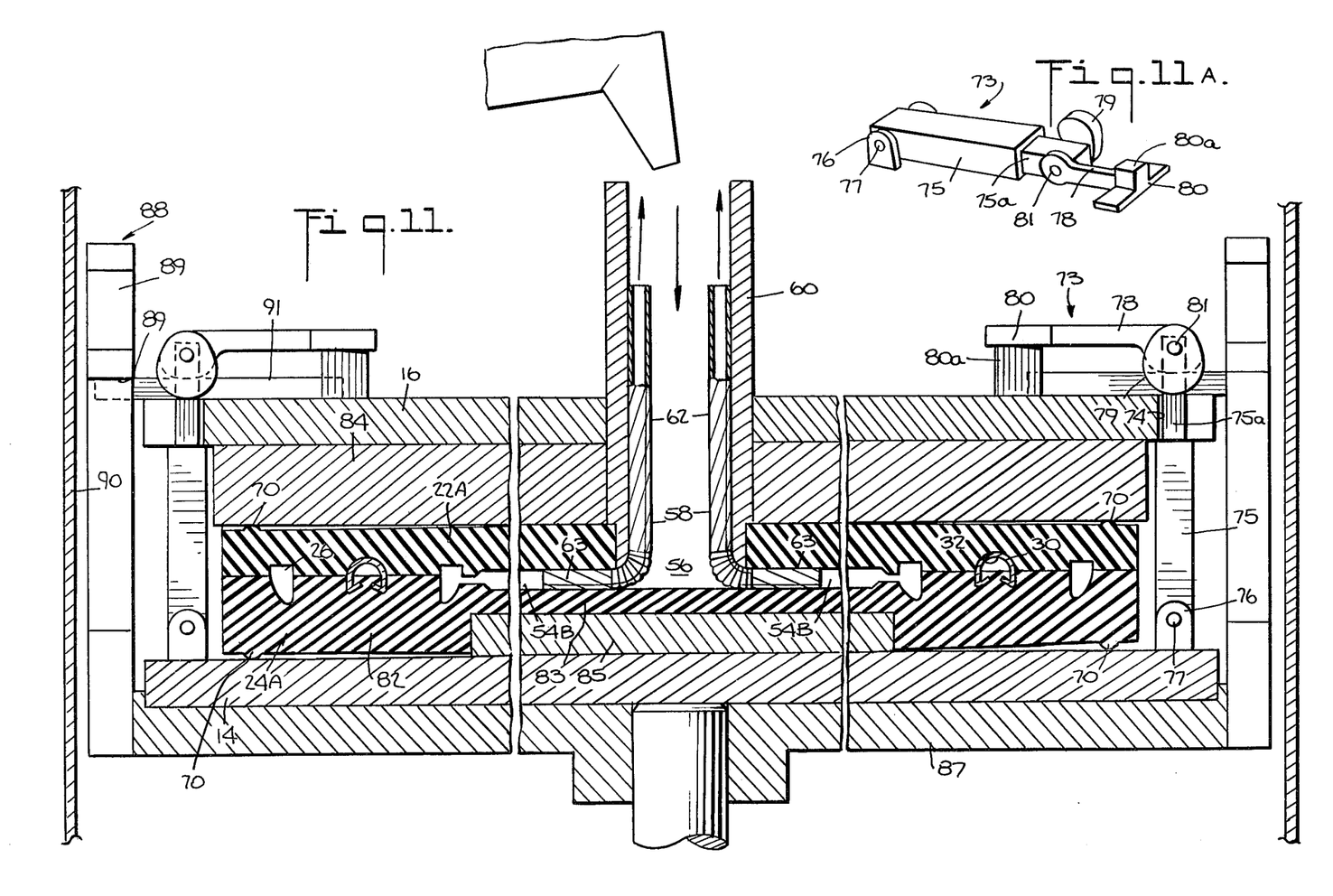
FIG. 11 is a cross-section view similar to that of FIG. 3 showing mold apparatus according to another embodiment of the invention.
FIG. 11A is a perspective view of a locking lever used to lock the mold assembly of FIG. 11.

A hinged-lever locking arrangement interconnecting the upper and lower frame members may be used instead of bolts 18 and nuts 20 to lock the mold halves together by a predetermined, reproducible force. The locking arrangement is shown in FIGS. 11 and 11A, and includes a plurality of hinged-levers 73 disposed about the lower frame and notches 74 disposed about the upper frame. Four hinged-levers and four notches equally spaced about the respective frame member are suitable. However, it is understood that more or less than four may be utilized as long as the mold halves are securely locked together under sufficient force to prevent separation of the halves during introduction of the resin and spin-casting. Each hinged-lever 73 comprises a connecting lever 75 hinged at one end thereof to the lower frame 14 by brackets 76 and a pin 77, and a locking lever 78 pivotably connected at one end thereof to the other end of the connecting lever. Portion 75a of the connecting lever 75 is of reduced thickness and is received in notch 74. The locking lever 78 includes a cam lock 79 extending at approximately a right angle from the locking lever and rigidly connected thereto. At the other end of the locking lever is disposed a finger grasp 80. A pin 81 rigidly connects the locking lever to the locking cam through a hole in the other end of the connecting lever. The end 80a of the finger grasp provides a positive stop for locking the frame with a predetermined reproducible force.

In the embodiment shown in FIG. 11, the lower mold half 24A is stepped, i.e., the peripheral portion is of a greater thickness than the central portion. This saves rubber mold material. An annular stepped mold portion 82 extends about the peripheral part of the mold half while the central region 83 is of reduced thickness. Cavities are disposed in the peripheral portion 82 which is of increased thickness to accomodate the cavities. Thus, there is a saving of rubber mold material in the central part of the mold half. In addition, the upper mold half 22A is one-half the normal rubber thickness to further conserve rubber mold material.

As mentioned, the upper and lower frame members 14, 16 are rigid and thereby prevent any flexing of the mold halves during removal from the spin caster apparatus and transporting of the assembled mold for curing.

Upper and lower back-up plates 84, 85 are provided for the embodiment of FIG. 11. The lower back-up plate 85 is sized to fit within the reduced thickness central region 83 of the lower mold half 24A and the upper back-up plate 84 is approximately of the same diameter as the upper mold half 22A. While the lower back-up plate 85 is required to take up the annular space in the central region of the stepped lower mold half, the upper back-up plate 84 is optional and provides additional support for the flexible mold and further prevents flexing. Additionally, use of the upper and lower back-up plates permits use of the same upper 16 and lower 14 frame members of FIG. 2 with the assembled mold height being the same as that of FIG. 2 since the lower back-up plate 85 takes up the space in the central region of the stepped lower mold half and the upper back-up plate 84 takes up the space resulting from the half-thickness upper mold half. Alternatively, the lower frame member could be stepped in the central portion thereof to have an increased thickness and the lower back-up plate eliminated. In such an embodiment, the lower frame member differs from that in FIG. 2. Additionally, the upper back-up plate could be eliminated and in such an embodiment, the overall height of the assembled mold differs from that in FIG. 2.

Advantageously, each of the back-up plates and frame members is made from a light-weight metal such as aluminum.

The mold of FIG. 11 is assembled as follows. The hinge posts 71 or other hardware inserts are positioned in the mold as described above for the mold of FIG. 2. The sprayed mold halves 22A, 24A are joined and the locators 30, 32 mated to properly align the mold cavity portions in the mold halves. The joined mold is then sandwiched by the rigid back-up plates 84, 85 and placed on the lower frame member 14. The upper frame member 16 is located on the lower frame member and on the upper back-up plate and the assembly locked by actuating the hinged levers into the position shown in FIG. 11.

Referring now to FIGS. 1–3 and 11, the spin caster 86 comprises a turntable 87 and a plurality of slotted arms 88 having slots 89 with the arms being spaced about and connected to the turntable to rotate therewith. The spin caster may also include a housing 90 enclosing the turntable and slotted arms, and a safety cover (not shown) which disables the spin caster to prevent spinning of turntable 87 when the cover is not closed. Secured to the top of upper frame member 16 by screws, for example, are flanges 91 which extend radially outwardly beyond the periphery of the frame member. The flanges 91 are spaced about the periphery of the frame member and are of a thickness to be received in a respective slot 89 of a respective slotted arm 88 as shown in FIG. 1. The flanges are engaged by the central posts 92 of the slotted arms during rotation of the turntable and arms so that the mold assembly is rotated.

Figure 2:
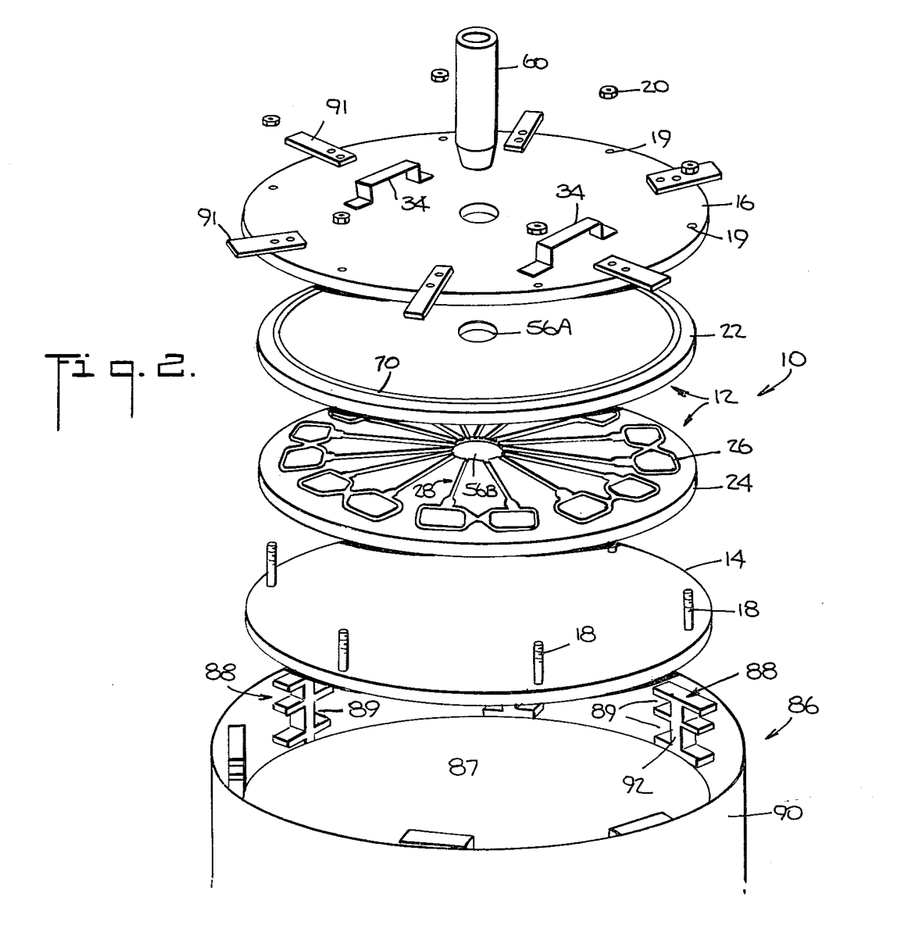
FIG. 2 is an exploded perspective view of the mold apparatus of FIG. 2 showing the flexible mold halves and the rigid upper and lower mold frame members.

The mold assembly of FIGS. 2 and 11 may then be secured to the spin caster for production of the eyeglass fronts. Preferably, the mold assembly is preheated before the liquid resin system is introduced therein as will be described more fully hereinafter.

Figures 6, 12, 13:
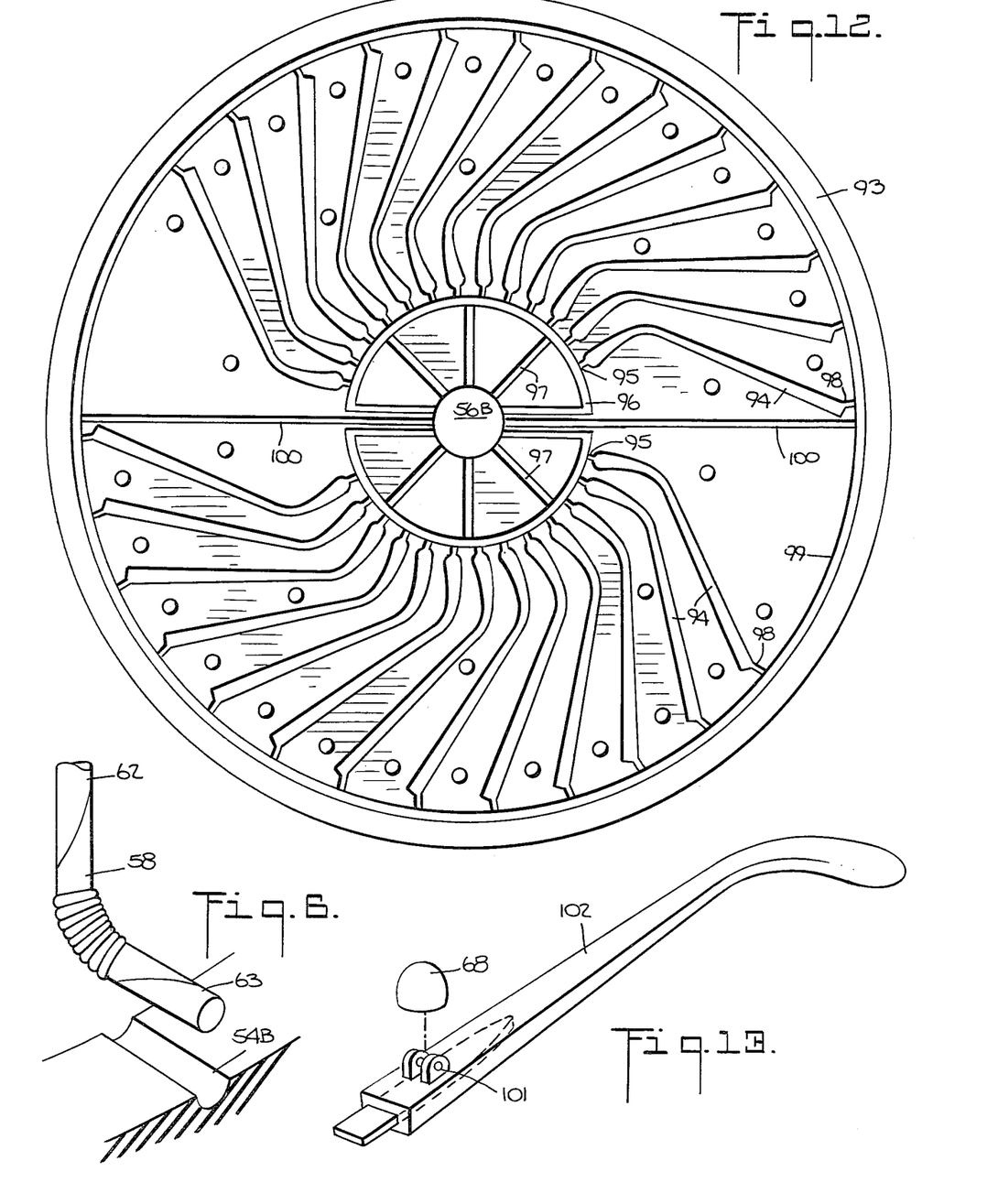
FIG. 6 is a perspective view showing a portion of the tubular member in the form of a bendable drinking straw used as the hollow vent member venting the pairs of runners and a respective mold cavity in FIG. 4 to the atmosphere.
FIG. 12 is a top plan view of a flexible mold half according to the invention for producing eyeglass temples and which shows the cavity layout and the runner system according to the invention.
FIG. 13 is a perspective view of a temple formed in accordance with the invention from the mold of FIG. 12.

Referring now to FIG. 12, a lower mold half 93 is shown for producing eyeglass temples. The mold cavities 94 for the temples are circumferentially disposed about the mold and extend radially outwardly therein. The inner radial end 95 of each temple mold is connected by a gate to a circumferentially-extending runner 96 which in turn is connected by another gate to the central cavity by runners 97. The outer end 98 of each mold cavity 94 is connected by a gate to another circumferentially extending runner 99. The temple mold cavities may also be disposed in a position rotated 180° from that shown in FIG. 12, with the positions of ends 95 and 98 being reversed. The circumferentially extending runner 99 is connected to the central cavity by a plurality (two being illustrated) of additional runners 100. The liquid resin system is introduced during spinning through the feed spout (as for the mold of FIG. 1) and enters the central cavity. The liquid resin system then passes through the runners 97 to the circumferentially-extending runner 96 and into the mold cavities 94. The liquid resin system continues to move radially outwardly leaving the mold cavities through the outer ends 98. The liquid resin system then moves into the circumferentially extended runner 99. The liquid resin system enters runners 100 and is returned to the central cavity. Air is forced from the mold cavities by the entering liquid resin system and leaves the mold cavities through outer ends 98, entering the circumferentially extending runner 99. The air then moves through the additional runners 100 into the central cavity through runners 100, whereby air is removed from the mold cavities. Air is also removed through ends 95 of the mold cavities and runners. Although the vent system used for the mold of FIG. 1 is not shown in FIG. 12, it is contemplated that the vent system (FIGS. 3, 4 and 6) may also be used in the mold 93 of FIG. 12. In such an embodiment, straws 58 are placed in runners 100 and extend into the central cavity as described above for the vent system of FIGS. 3 and 4. Runners 100 then become returns for the liquid resin system as described for downstream runners 54B, with the straws providing an unobstructed air passage to above the liquid resin system level in the feed spout. Additionally, the gates 64A, B illustrated in FIGS. 7–9 may also be used to connect the runners to the mold cavities 94.

To produce temples using temple mold halves, masking in the form of a cap 68 (FIG. 13) or sealant for hinge inserts 101 and holes therein is accomplished and a mold assembly assembled as described for the assemblies of FIGS. 1 and 11. A completed temple 102 is shown in FIG. 13.

Spin cast eyeglass fronts and temples may be made of D.E.R. 332 epoxy resin and Jeffamine D230 in stoichiometric proportions, and small amounts of Perox blue dye and Cyasorb UV 1988 and preferably also Mark 1178 by the following process employing the mold 10. The bendable straws 58 of the vent system are positioned in the downstream runners 54B and extend upwardly from the central cavity 56 of the lower mold half. The hinge posts are masked and inserted and the mold halves are mated and placed between the mold frame members which are locked as described to compress the mold halves. The spout 60 is positioned in the center of the mold communicating with the runner system (the straw ends being located within the spout above the entry point of the liquid resin). A temple mold is similarly assembled.

The assembled mold is placed in an oven and preheated to a given temperature, e.g., from about 60° C. to about 100° C. The liquid resin system is mixed and degassed.

The assembled mold is placed in the spin caster as described. The spin caster turntable is provided with a layer of transite (not shown) to reduce heat losses from the preheated mold assembly.

The mold assembly is rotated at about 400 rpm and the liquid resin system is quickly poured into the mold spout. Spinning is continued for about five to about fifteen minutes.

The rigid mold assembly is then removed from the spin caster while the molded parts are still soft and uncured and as yet not self-supporting or able to retain their molded shape, and placed in an oven at a temperature of from about 110° C. to about 130° C. for from about one hour to about two hours to cure. Thereafter, the mold is cooled below the cured resin softening temperature, for example to room temperature, disassembled and the parts removed.

The mold is cleaned and the molding cycle is repeated.

The fronts and temples are degated by hand (using a hot knife or file, for example), dry or wet tumbled with an abrasive to dull the finish, cleaned (ultrasonically, for example), post dyed for color (dipped in an organic dye solution, for example), washed to remove excess dye, dried and overcoated (with polyurethane, for example) to provide a high gloss chemical and abrasion resistant coating.

EXAMPLE

Specific examples of the invention are set forth below. The examples are illustrative and are not to be understood as limiting the scope and underlying principles of the invention in any way.

Eyeglass fronts and temples were made using mold apparatus 10, and a mold apparatus including a mold half such as 93, respectively, and the method as generally described hereinbefore.

Specifically, a liquid resin system of the materials listed immediately below in the indicated proportions in parts by weight (the D.E.R. 332 epoxy resin and the Jeffamine D230 in stoichiometric proportions) was formed by mixing the materials and degassing the mixture.

| D.E.R. 332 epoxy resin | 100 |
| Jeffamine D230 | 33.3 |
| Perox 3B blue dye | trace |
| Cyrasorb UV 1988 | 1.0 |
| Mark 1178 | 0.25 |

The liquid resin system has a viscosity of between 200 cps to about 300 cps. The molds are assembled as described above, preheated to about 76° C. and mounted on the spin caster. The molds are rotated at about 400rpm and the liquid resin system is introduced into the molds through the center spout. Spinning is continued for about 10 minutes during and after introduction of the liquid resin system. The molds are then removed from the spin caster while the resin system in the mold cavities is soft and uncured and as yet not self-supporting and placed in an oven to cure the eyeglass fronts and temples at an oven temperature of about 120° C. for about 90 minutes, whereafter the eyeglass fronts and temples are hardened. Thereafter, the molds are cooled to room temperature, disassembled and the hardened eyeglass fronts and temples illustrated in FIGS. 7 and 13 are removed from the molds.

The eyeglass fronts and temples are degated by hand using a file, tumbled to dull the finish, ultrasonically cleaned, post dyed by dipping the fronts and temples in an organic dye solution, washed to remove excess dye, and dried and overcoated with a polyurethane to provide a high gloss and chemical and abrasion resistant finish.

The fronts and temples thus produced exhibit the following typical characteristics:

TABLE I

| Physical Properties | |
| --- | --- |
| Flexural Strength | 19,000 psi |
| Flexural Modulus | 230,000 psi |
| Hardness (Barcol) | 20 |
| Heat Distortion (Softening) Temperature | 77° C. |
| Impact Strength | 2.9 ft. lbs/inch of notch |
| Flammability Resistance | Excellent |
| Abrasion Resistance | Excellent |
| Salt Spray Resistance | Excellent |
| U.V. Resistance | Excellent |
| Heat Stability | Excellent |
| Perspiration Resistance | Excellent |

The advantages of the present invention, as well as certain changes and modifications of the disclosed embodiments and examples thereof, will be readily apparent to those skilled in the art.

By way of further example and not by way of limitation, diglycidyl ethers of propylene glycol may be substituted for from about 15% to about 30% of a BIS-type epoxy resin in the resin system of the invention. Additionally, amine curing agents constituted by 15% Jeffamine D-400 and 85% N-(3-aminopropyl)cyclohexamine and by 30% Jeffamine D-400 and 70% Jeffamine D-230 may be utilized in the liquid resin system of the invention. Moreover, Cyasorb UV 2300, and UV 5411, and Mark 446 are suitable as ultra-violet absorbers, and Mark 366, Mark C, and Cyanox 1735 as antioxidants, Cyasorb and Cyanox, and Mark being trade names of American Cyanamid Co. and Argus Chemical Co., respectively.

It is the applicants' intention to cover by their claims all those changes and modifications which could be made to the embodiments and example of the invention herein chosen for the purpose of the disclosure without departing from the spirit and scope of the invention.

What is claimed is:

1. A spin casting process for producing a solid, substantially clear, low color thermoset plastic part which has a cross-linked structure when cured, particularly an eyeglass part, in a flexible mold from a curable liquid resin system, the flexible mold including separable mold portions at least one of which is flexible and which define at least one mold cavity when the mold portions are assembled to form the flexible mold, means being provided for rigidly holding the mold portions together as a rigid, transportable mold assembly, said process comprising the steps of:

assembling the mold portions to form the flexible mold;

introducing the liquid resin system comprising an epoxy resin and a curing agent therefor which are substantially clear and of low color into the flexible mold;

rotating the flexible mold in the rigid mold assembly in or on spinning apparatus until the liquid resin system is distributed in the mold cavity but is still soft and uncured and is yet not self-supporting;

removing the rigid mold assembly including the flexible mold as a rigid unit from the spinning apparatus while the liquid resin system therein is still soft and uncured and is yet not self-supporting;

hardening the liquid resin system while in the rigid mold assembly after removal of the rigid mold assembly from the spinning apparatus to form the part; and thereafter disassembling the rigid mold assembly and removing the part.

2. The process as recited in claim 1, wherein the rigid mold assembly is assembled as a transportable rigid unit, transported to the spinning apparatus as a rigid unit and thereafter rotated by the spinning apparatus.

3. The process as recited in claim 1 and including the step of post dying the part after its removal from the mold assembly.

4. A spin casting process for producing a solid thermoset plastic part which has a cross-linked structure when cured, particularly an eyeglass part, in a flexible mold from a curable liquid resin system, the flexible mold including separable mold portions at least one of which is flexible and which define at least one mold cavity when the mold portions are assembled to form the flexible mold, means being provided for rigidly holding the mold portions together as a rigid, transportable mold assembly, said process comprising the steps of:

assembling the mold portions to form the flexible mold;
introducing the liquid resin system into the flexible mold;
rotating the flexible mold in the rigid mold assembly in or on spinning apparatus until the liquid resin system is distributed in the mold cavity but is still soft and uncured and is yet not self-supporting;
removing the rigid mold assembly including the flexible mold as a unit from the spinning apparatus while the liquid resin system therein is still soft and uncured and is yet not self-supporting;
hardening the liquid resin system while in the rigid mold assembly after removal of the rigid mold assembly from the spinning apparatus to form the part; and
thereafter disassembling the rigid mold assembly and removing the part.

5. The process as recited in claim 4, wherein the mold assembly is assembled as a transportable rigid unit, transported to the spinning apparatus as a rigid unit and thereafter rotated by the spinning apparatus.

6. The process as recited in claim 4 or 5, wherein the liquid resin system is introduced into the assembled and transportable rigid mold assembly while on the spinning apparatus.

7. The process as recited in claim 1, and further comprising the step of applying a mold release agent to the mold portions prior to assembling them.

8. The process as recited in claim 7, wherein the mold-portions comprise from about 50% to about 100% by weight of heat vulcanizable ethylene propylene diene monomer rubber and the mold release agent is a TFE spray.

9. The process as recited in claim 1, wherein the assembled flexible mold is preheated before the liquid resin system is introduced therein.

10. The process as recited in claim 1, wherein the liquid resin system when cured has a softening temperature of from about 65° C. to about 95° C.

11. The process as recited in claim 10, wherein the assembled flexible mold is preheated to a temperature of from about 60° C. to about 100° C. before the liquid resin system is introduced therein.

12. The process as recited in claim 10, wherein the rigid mold assembly after removal from the spinning apparatus is placed in an oven at a temperature of from about 70° C. to about 150° C. for from about one to about two hours to cure the cast part.

13. The process as recited in claim 12, wherein the rigid mold assembly is thereafter cooled to below the softening temperature of the cured part and the rigid mold assembly disassembled and the cured part removed therefrom.

* * * * *